US005427395A

United States Patent [19]
Urbach

[11] Patent Number: 5,427,395
[45] Date of Patent: Jun. 27, 1995

[54] LOWER CONTROL ARM FOR USE IN A VEHICLE WHEEL SUSPENSION SYSTEM

[75] Inventor: Brian A. Urbach, Rochester Hills, Mich.

[73] Assignee: TRW Inc., Lyndhurst, Ohio

[21] Appl. No.: 264,593

[22] Filed: Jun. 23, 1994

[51] Int. Cl.6 ............................ B60G 7/02; B60G 7/00
[52] U.S. Cl. ................................. 280/96.1; 280/663; 280/666; 280/673; 280/691
[58] Field of Search ............... 280/673, 674, 663, 666, 280/670, 660, 96.1, 690, 691, 696, 701; 267/228, 248

[56] References Cited

U.S. PATENT DOCUMENTS

| | | | |
|---|---|---|---|
| 2,835,521 | 5/1958 | White | 280/674 |
| 2,934,350 | 4/1960 | Herbenar | 280/666 |
| 2,944,831 | 7/1960 | Thomas | 280/96.1 |
| 3,144,259 | 8/1964 | Haan | 280/674 |

FOREIGN PATENT DOCUMENTS 1198223 12/1959 France ................. 280/96.1

*Primary Examiner*—Margaret A. Focarino
*Assistant Examiner*—Peter C. English
*Attorney, Agent, or Firm*—Tarolli, Sundheim & Covell

[57] ABSTRACT

A lower control arm (30) comprises a first portion (40) connectable to a vehicle frame part (28) for pivotable movement relative to the vehicle frame part, a second portion (50) connectable to the vehicle frame part for pivotable movement relative to the vehicle frame part, and a third portion (60) connectable to a steering knuckle (14) for pivotable movement relative to the lower control arm. The first portion of the lower control arm comprises a first ball joint (40) including a first ball portion (44) and a first stud portion (46) connected to the first ball portion and extending along a horizontal first axis (Y) in the forward and rearward directions of travel of the vehicle. The second portion of the lower control arm comprises a second ball joint (50) including a second ball portion (54) and a second stud portion (56) connected to the second ball portion and extending along a vertical second axis (A) perpendicular to the horizontal first axis. The third portion of the lower control arm comprises a third ball joint (60) including a third ball portion (64) and a third stud portion (66) connected to the third ball portion and extending along a vertical third axis (B) parallel with the vertical second axis and in a direction opposite to the second stud portion of the second ball joint.

7 Claims, 2 Drawing Sheets

LOWER CONTROL ARM FOR USE IN A VEHICLE WHEEL SUSPENSION SYSTEM

BACKGROUND OF THE INVENTION

1. Technical Field

The present invention relates to a vehicle wheel suspension system, and is particularly directed to a lower control arm for use in a vehicle wheel suspension system.

2. Background Art

Lower control arms for use in a vehicle wheel suspension system are known. A typical lower control arm comprises (i) a ball Joint to which a steering knuckle is pivotably connected, and (ii) at least one rubber bushing which is connectable to a vehicle frame part of the vehicle.

There are a number of disadvantages in using a rubber bushing in a typical lower control arm. One disadvantage is that the spring rate and damping rate of the rubber bushing change as the rubber material of the rubber bushing ages and/or is attacked by chemicals. When this occurs, the overall vehicle spring and damping rate is affected which, in turn, affects vehicle ride and handling.

Another disadvantage is that the rubber material of the rubber bushing is deflectable. If the rubber material deflects, the lower control arm deflects. The amount of deflection may be as high as 0.25 inches. If the lower control arm deflects, both vehicle static wheel alignment and vehicle dynamic wheel alignment are affected which may cause imprecise and/or unstable handling characteristics.

Still another disadvantage is that the rubber bushing makes noises as relative movement occurs between the rubber bushing and mating steel parts. Also, the rubber bushing has relatively high internal friction. Due to the relatively high internal friction of the rubber bushing, some vibrations and loads are transmitted through the rubber bushing before suspension compliance can eliminate them.

SUMMARY OF THE INVENTION

In accordance with the present invention, a vehicle wheel suspension system comprises a steering knuckle for supporting a vehicle wheel for rotation relative to the steering knuckle. An upper control arm includes (i) a first portion connected to the steering knuckle for relative pivotable movement of the steering knuckle and the upper control arm, and (ii) a second portion connectable to a vehicle frame part for relative pivotable movement of the upper control arm and the vehicle frame part. A lower control arm includes (i) a first portion connectable to a vehicle frame part for relative pivotable movement of the lower control arm and the vehicle frame part, (ii) a second portion connectable to a vehicle frame part for relative pivotable movement of the lower control arm and the vehicle frame part, and (iii) a third portion connectable to the steering knuckle for relative pivotable movement of the steering knuckle and the lower control arm.

The first portion of the lower control arm comprises a first ball joint including a first ball portion and a first stud portion connected to the first ball portion and extending along a horizontal first axis in the forward and rearward directions of travel of the vehicle. The second portion of the lower control arm comprises a second ball joint including a second ball portion and a second stud portion connected to the second ball portion and extending along a vertical second axis perpendicular to the horizontal first axis. The third portion of said lower control arm comprises a third ball joint including a third ball portion and a third stud portion connected to the third ball portion and extending along a vertical third axis parallel with the vertical second axis in a direction opposite to the second stud portion of the second ball joint.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
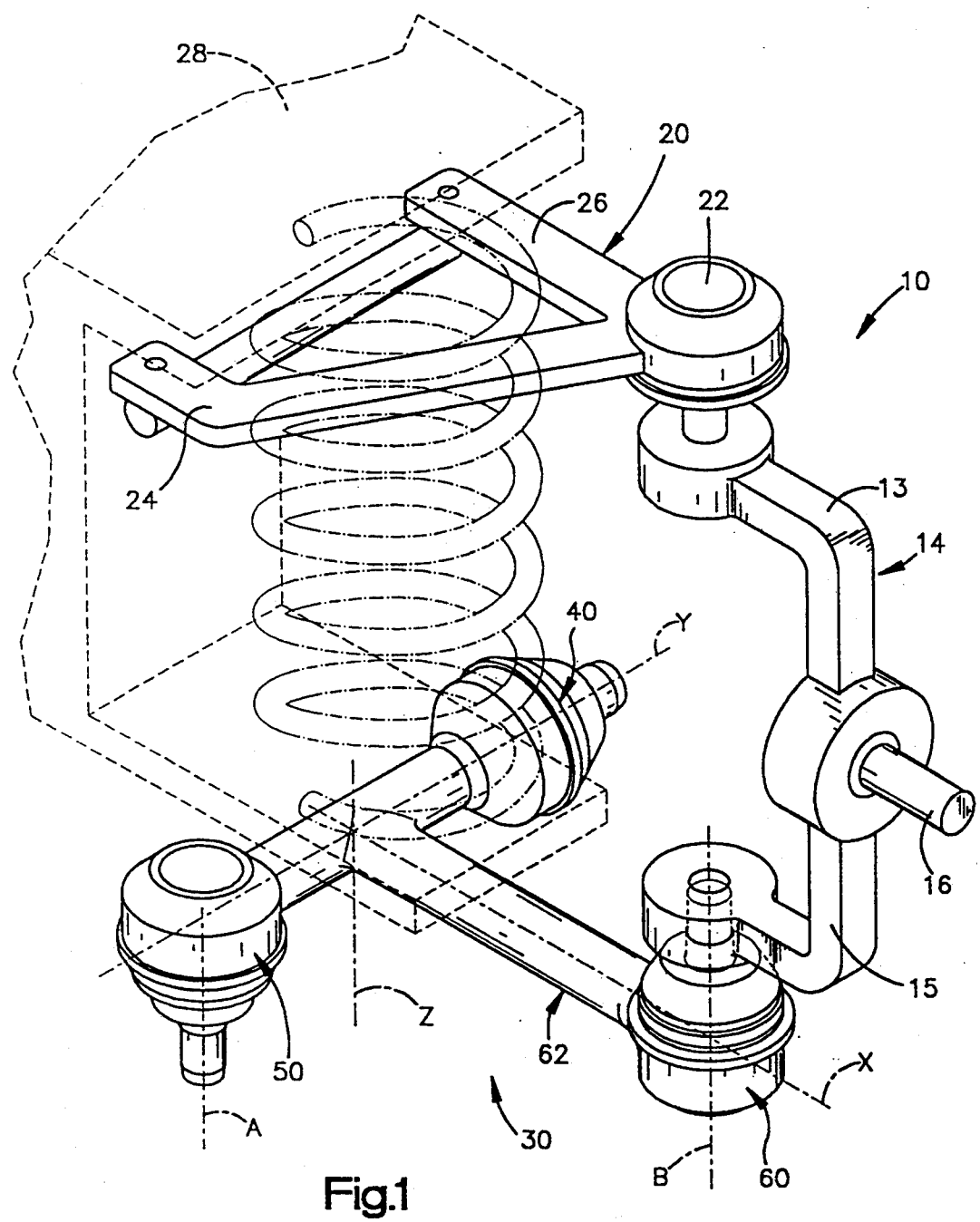
FIG. 1 is a perspective schematic view of a vehicle wheel suspension system embodying a lower control arm constructed in accordance with the present invention.

The present invention is directed to a lower control arm for use in a vehicle wheel suspension system. The specific construction of the lower control arm may vary. A vehicle wheel suspension system 10 embodying a lower control arm constructed in accordance with the present invention is shown in FIG. 1.

The vehicle wheel suspension system 10 comprises a steering knuckle 14 having an upper lever arm portion 13 and a lower lever arm portion 15. A spindle portion 16 is disposed between the upper and lower lever arm portions 13, 15. A vehicle wheel (not shown) is mountable onto the spindle portion 16 and is rotatable about the spindle portion 16.

The vehicle wheel suspension system 10 further comprises an upper control arm 20 having a first portion 22 in the form of a ball joint which is operatively connected to the steering knuckle 14 to provide for relative pivotable movement of the steering knuckle 14 and the upper control arm 20. The upper control arm 20 has a second portion 24 in the form of an extension arm which is connectable to a vehicle frame part 28 to provide for relative pivotable movement of the upper control arm 20 and the vehicle frame part 28. The upper control arm 20 also has a third portion 26 in the form of an extension arm which is connectable to the vehicle frame part 28 to provide for relative pivotable movement of the upper control arm 20 and the vehicle frame part 28.

The vehicle wheel suspension system 10 further comprises a lower control arm 30 having a first portion 40 in the form of a first ball joint which is connectable to the vehicle frame part 28, and a second portion 50 in the form of a second ball joint which is also connectable to the vehicle frame part 28. The lower control arm 30 also has a third portion 60 in the form of a third ball joint which is connected to the steering knuckle 14. A T-shaped arm 62 interconnects the first, second, and third ball joints 40, 50, 60.

Figure 2:
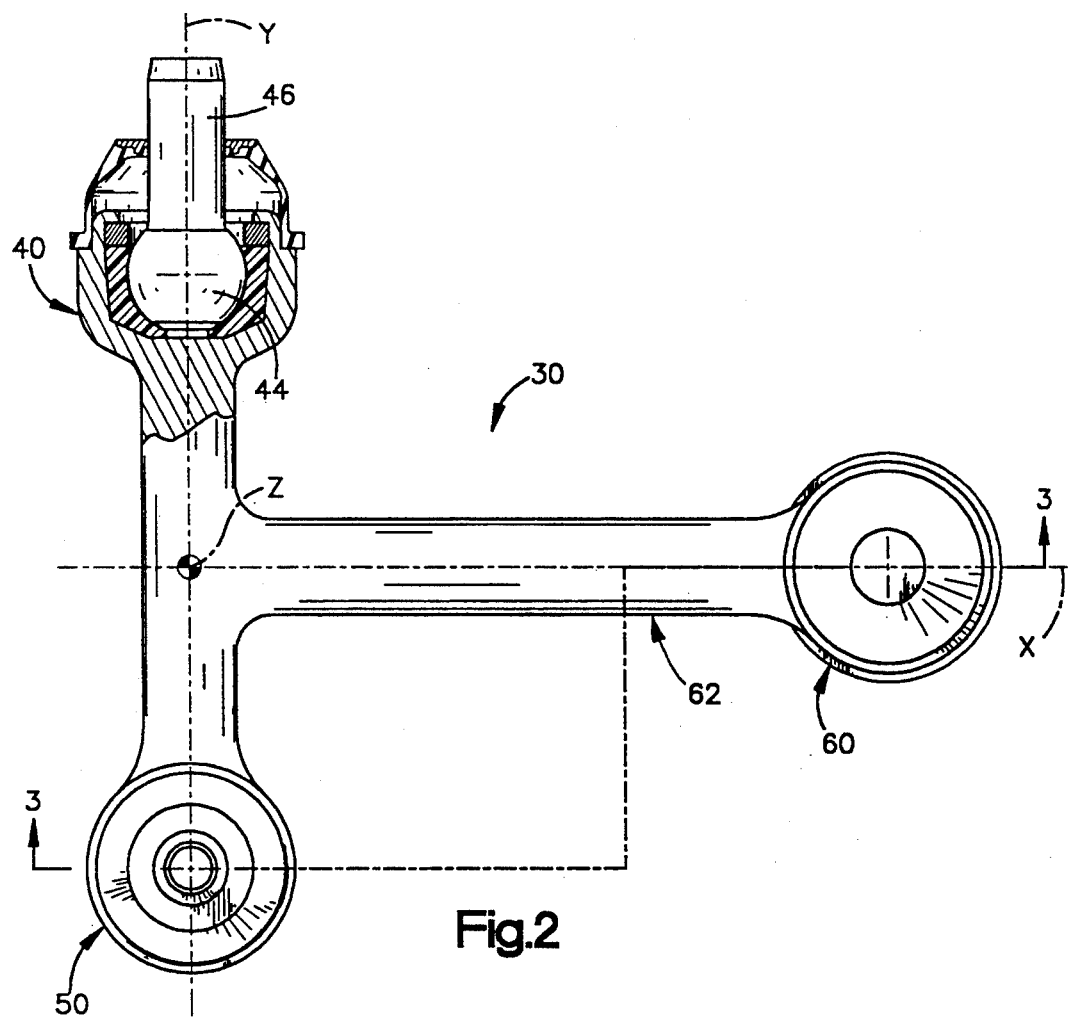
FIG. 2 is a top view of the lower control arm of FIG. 1.
Figure 3:
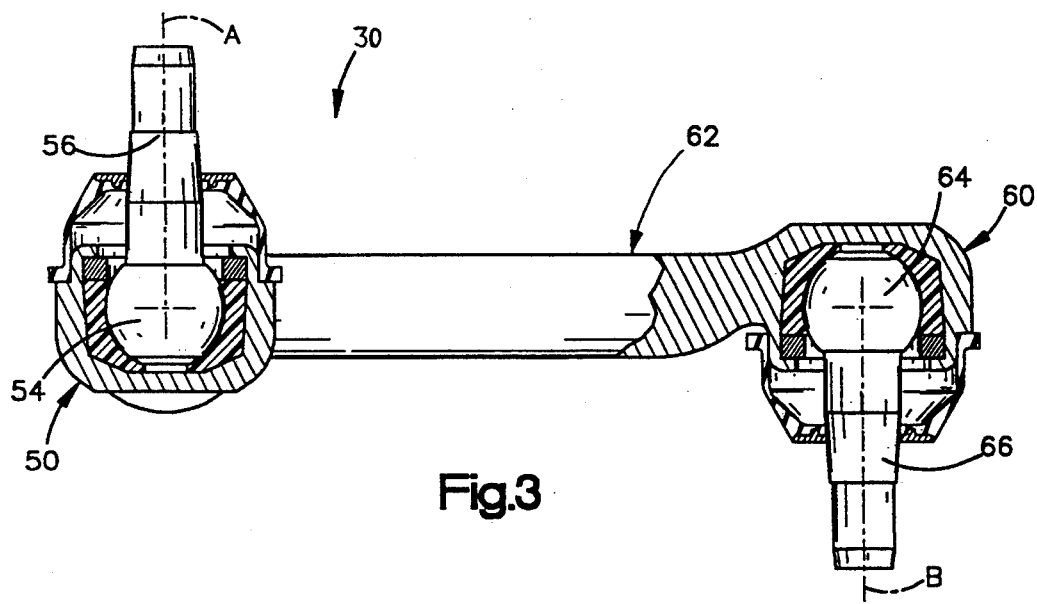
FIG. 3 is a view taken along the line 3—3 of FIG. 2.

Referring to FIGS. 2 and 3, the first ball joint 40 includes a first ball portion 44 and a first stud portion 46 connected to the first ball portion 44. The first stud portion 46 is connectable to the vehicle frame part 28 to provide for relative pivotable movement of the lower control arm 30 and the vehicle frame part 28. Preferably, the first ball joint 40 is of the straight shank type. This allows for manufacturing variations to be compensated for in the lower control arm 30 and the vehicle frame part 28 by variable clamping.

The first stud portion 46 extends along a horizontal axis, designated as the Y axis, in the forward and rearward directions of travel of the vehicle. A vertical second axis, designated as the Z axis, extends perpendicular to the Y axis, as shown in FIGS. 1 and 2. Also, as shown in FIGS. 1 and 2, a horizontal third axis, designated as the X axis, extends perpendicular to the plane formed by the Y and Z axes.

The second ball joint 50 includes a second ball portion 54 (FIG. 3) and a second stud portion 56 connected to the second ball portion 54. The second stud portion 56 is connectable to the vehicle frame part 28 to provide for relative pivotable movement of the lower control arm 30 and the vehicle frame part 28. The second stud portion 56 extends along a vertical axis, designated as the A axis, which is parallel to the Z axis. Preferably, the second ball joint 50 is of the tapered type. This allows the lower control arm 30 to be exactly positioned between the vehicle frame part 28 and the steering knuckle 14.

The third ball joint 60 includes a third ball portion 64 and a third stud portion 66 connected to the third ball portion 64. The third stud portion 66 is connected to the steering knuckle 14 to provide for relative pivotable movement of the steering knuckle 14 and the lower control arm 30. The third stud portion 66 extends along a vertical axis, designated as the B axis, which is parallel with the Z axis. The B axis extends perpendicular to the X axis. The third stud portion 66 extends along the B axis in a direction which is opposite to the direction the second stud portion 56 extends along the A axis.

When steering movement of the vehicle wheel is effected by turning the vehicle steering wheel (not shown) in the vehicle occupant compartment, the steering knuckle 14 moves in a direction corresponding to the direction of travel of the vehicle steering wheel. The third ball joint 60 pivotably connected to the lower lever arm portion 15 of the steering knuckle 14 allows the steering knuckle 14 to move along all three axes X, Y, Z in accordance with the steering direction of the vehicle wheel effected by turning of the vehicle steering wheel. While steering movement of the vehicle wheel is occurring and the third ball joint 60 is allowing the steering knuckle 14 to move along all three axes X, Y, Z, the second ball joint 50 resists movement of the lower control arm 30 along the X and Z axes. The second ball joint 50 may oscillate about the Y axis during steering movement of the vehicle wheel. At the same time, the first ball joint 40 also resists movement of the lower control arm 30 along the X and Z axes. The first ball joint 40 allows rotation of the lower control arm 30 about the Y axis only.

A number of advantages result by using a lower control arm constructed in accordance with the present invention in a vehicle wheel suspension system. One advantage is that the vehicle static wheel alignment and the vehicle dynamic wheel alignment are held in a more precise as designed attitude. This advantage occurs because each of the ball joints 40, 50, 60 has deflections only on the order of about 0.01 inches. Since movements of the ball joints 40, 50, 60 due to deflections are essentially eliminated, handling characteristics of the vehicle are improved. Also, since each of the ball joints 40, 50, 60 has virtually no spring or damping characteristics of movement, the overall vehicle spring and damping rate is improved, resulting in improved vehicle ride and handling.

Another advantage is that the effects of aging and/or chemical attacks are minimal since each of the ball joints 40, 50, 60 is covered with a seal and has no exposed working surfaces. Further, each of the ball joints 40, 50, 60 has plastic bearings which isolate vibrations, resulting in relatively quiet operation of the lower control arm 30. Also, since each of the ball joints 40, 50, 60 has relatively low friction, suspension compliance can react faster to eliminate vibrations and shock loads, resulting in improved vehicle ride and handling.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. A lower control arm for use in a vehicle suspension system having a steering knuckle and an upper control arm pivotably connected to the steering knuckle, said lower control arm comprising:

a first portion connectable to a vehicle frame part for pivotable movement relative to the vehicle frame part;

a second portion connectable to a vehicle frame part for pivotable movement relative to the vehicle frame part; and a third portion connectable to the steering knuckle for pivotable movement of the steering knuckle relative to said lower control arm;

said first portion of said lower control arm comprising a first ball joint including a first ball portion and a first stud portion connected to said first ball portion and extending along a horizontal first axis in the forward and rearward directions of travel of the vehicle;

said second portion of said lower control arm comprising a second ball joint including a second ball portion and a second stud portion connected to said second ball portion and extending along a vertical second axis perpendicular to said horizontal first axis;

said third portion of said lower control arm comprising a third ball joint including a third ball portion and a third stud portion connected to said third ball portion and extending along a vertical third axis parallel with said vertical second axis and in a direction opposite to said second stud portion of said second ball joint.

2. A lower control arm according to claim 1 wherein said first ball joint is of the straight shank type.

3. A lower control arm according to claim 1 wherein said second ball joint is of the tapered shank type.

4. A vehicle wheel suspension system comprising:

a steering knuckle for supporting a vehicle wheel for rotation relative to said steering knuckle;

an upper control arm including (i) a first portion connected to said steering knuckle for relative pivotable movement of said steering knuckle and said upper control arm, and (ii) a second portion connectable to a vehicle frame part for relative pivotable movement of said upper control arm and the vehicle frame part; and a lower control arm including (i) a first portion connectable to a vehicle frame part for relative pivotable movement of said lower control arm and the vehicle frame part, (ii) a second portion connectable to a vehicle frame part for relative pivotable movement of said lower control arm and the vehicle frame part, and (iii) a third portion connected to said steering knuckle for relative pivotable movement of said steering knuckle and said lower control arm;

said first portion of said lower control arm comprising a first ball joint including a first ball portion and a first stud portion connected to said first ball portion and extending along a horizontal first axis in the forward and rearward directions of travel of the vehicle;

said second portion of said lower control arm comprising a second ball joint including a second ball portion and a second stud portion connected to said second ball portion and extending along a vertical second axis perpendicular to said horizontal first axis;

said third portion of said lower control arm comprising a third ball joint including a third ball portion and a third stud portion connected to said third ball portion and extending along a vertical third axis parallel with said vertical second axis and in a direction opposite to said second stud portion of said second ball joint.

5. A vehicle wheel suspension system according to claim 4 wherein said first ball joint is of the straight shank type.

6. A vehicle wheel suspension system according to claim 4 wherein said second ball joint is of the tapered shank type.

7. In combination with a vehicle wheel suspension system of the type wherein an upper control arm pivotably interconnects a vehicle frame part and a steering knuckle, and a lower control arm pivotably interconnects the vehicle frame part and the steering knuckle, the improvement which comprises:

said lower control arm including a first portion connected to the vehicle frame part for relative pivotable movement of said lower control arm and the vehicle frame part;

said lower control arm including a second portion connected to the vehicle frame part for relative pivotable movement of said lower control arm and the vehicle frame part; and said lower control arm including a third portion connected to the steering knuckle for relative pivotable movement of the steering knuckle and said lower control arm;

said first portion of said lower control arm comprising a first ball joint including a first ball portion and a first stud portion connected to said first ball portion and extending along a horizontal first axis in the forward and rearward directions of travel of the vehicle;

said second portion of said lower control arm comprising a second ball joint including a second ball portion and a second stud portion connected to said second ball portion and extending along a vertical second axis perpendicular to said horizontal first axis; and said third portion of said lower control arm comprising a third ball joint including a third ball portion and a third stud portion connected to said third ball portion and extending along a vertical third axis parallel with said vertical second axis and in a direction opposite to said second stud portion of said second ball joint.

* * * * *